Aug. 4, 1964

T. E. MITCHELL ETAL
INFORMATION CODING AND SENSING BY MEANS
OF BETA-RAY BACKSCATTERING 3,143,649

Filed March 19, 1959

Inventors:
Thomas E. Mitchell
Orear Kenton Neville
Ariel G. Schrodt
By Graf, Nirman & Burmeister
Attorneys

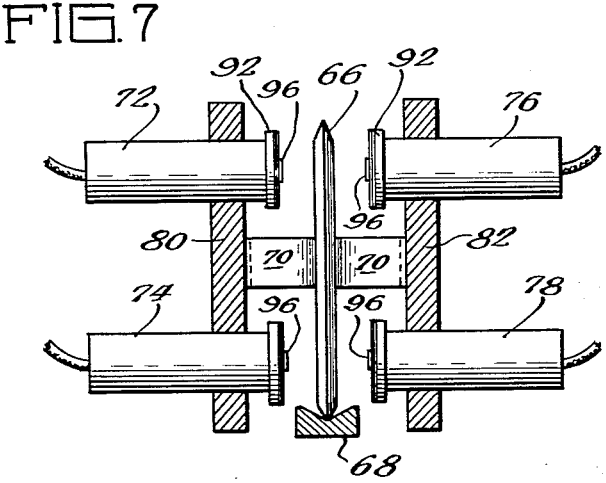
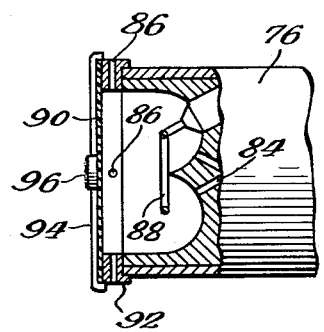
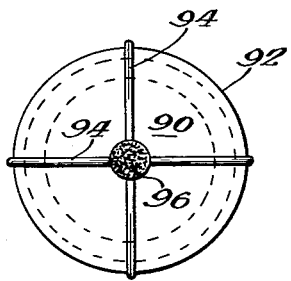
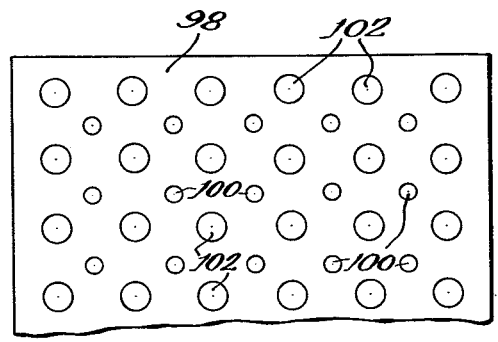
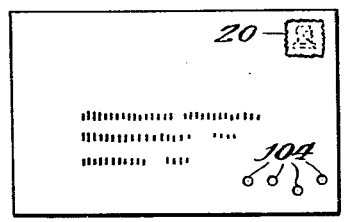

United States Patent Office 3,143,649
Patented Aug. 4, 1964

3,143,649
INFORMATION CODING AND SENSING BY
MEANS OF BETA-RAY BACKSCATTERING
Thomas E. Mitchell, Park Ridge, Orear Kenton Neville,
Elmhurst, and Ariel G. Schrodt, Wilmette, Ill., assignors to Nuclear-Chicago Corporation, Cook County, Ill.,
a corporation of Delaware
Filed Mar. 19, 1959, Ser. No. 800,554
17 Claims. (Cl. 250—83.3)

This invention relates to an improvement in systems for impressing coded information on background materials, and reading out the information so impressed. In its more specific aspects, the invention relates to systems for impressing information on objects such as paper containers, and thereafter, as part of an automatic type of handling system, reading out and employing the information for appropriate handling of the containers. In an even more specific aspect, the invention is concerned with automatic post office handling of mail, specifically with a system for sensing the location of a postage stamp (this term including all forms of postage-paid indicators) so that all envelopes can be arranged in the same orientation by automatic machinery, preliminary to further handling.

The present invention was devised for the solution of a highly important problem encountered in mail-handling. The nature of this specific problem and the manner of its solution will be discussed at some length herein, but the teachings of the invention will readily be seen to be applicable to many other uses.

Various types of systems for automatic handling and distribution of objects such as punched cards, cancelled checks, etc., are by now well known. The automation of the handling of such objects is fairly commonplace. The employment of coded information, in the form of punchings and other similar indicia, is now fairly widespread in the keeping of records, the rendering of statements, the preparation of checks, and similar types of business practices, the encoded information permitting later sorting by automatic machinery, as in the compilation of particular information from bookkeeping records, or the sorting of cancelled checks or paid statements after their transmittal and return. The proper impressing and reading out of such information obviously imposes, as a practical requirement, that the information-impressing operation and the read-out operation be performed with the card, check, statement, etc., in some type of standardized position. In many applications of such systems, this matter of orientation constitutes no substantial problems, since the position is, in normal handling, kept constant throughout the existence and use of the object containing the coded information; the positioning of the card or other object at the time of impressment of the information requires no attention since the cards, checks, statements, etc., are prepared from blanks which are prearranged in their packaging in identical positions. In the case of, for example, bookkeeping records, inventory records, etc., kept in this automated fashion, the positioning of the individual card remains no substantial problem throughout its entire life, since it remains, at all times when it is not being actually processed in a sorting machine, in a large group of identical objects (except for the information impressed thereon), being filed away after each use and accordingly ready for further use without any type of sorting as to position.

On the other hand, items such as cancelled checks and statement stubs, when they are to be inserted in automatic sorting or handling machines must, as a preliminary operation, be placed in corresponding positions. In the simpler types of such latter systems, the objects to be sorted or otherwise handled are manually stacked in corresponding positions before insertion into the handling machines. In more complex types, the handling machine itself reads a code indicator which has been placed on the object as a part of the information originally impressed, this indicator being in a standard position on the object and thus serving to indicate to the machine the position in which the object has been inserted into the machine, the cards, etc., being then stacked or placed in the desired corresponding position by auxiliary handling apparatus built into the machine for this purpose and actuated by a suitable preliminary position-reading sensing means.

An area of activity in which relatively little progress has been made in automation is the handling of mail. The nature of the large number of operations performed in the handling of mail, from the time of its receipt by the post office of origination to the time of its distribution to the addressee, and the fact that many of these operations consist solely of looking at the address and sorting by city, post office of destination, and finally by individual delivery bin, are obviously such that a tremendous saving of manual labor can be accomplished by high speed automatic sorting machines analogous to those which are employed for other purposes. However, the problems involved in setting up a suitable system for automatic handling and sorting of mail are of great magnitude as compared with the much simpler problems of systems for superficially analogous purposes. As one aspect of the difficulty of the problem, pieces of mail, unlike cards, checks, statements, etc., are widely non-uniform both in size and manner of preparation. Secondly, the coding of information for purposes of automatic handling of mail must be completely non-destructive, and preferably inconspicuous; even when the problem of automatically arranging the mail pieces in uniform fashion has been satisfactorily solved, the impressment of address information which can be employed in automatic sorting and routing equipment obviously cannot be performed by the punching operations, etc., commonly employed for the coding of information on superficially analogous types of objects.

The economic aspects of automatic handling of mail are likewise, when closely examined, considerably different from those of other automatic handling systems which appear analogous until closer examination is made of the nature of the functions performed. Taking, for example, the operation of placing the envelopes in uniform orientation for further processing, either in impressing coded address information or in reading out and using the information for sorting, it will be seen upon study that the devising of a suitable automatic device for performing this orientation operation may well be critical to the economic practicality of any automatic handling systems. Where the operations to be performed by any automatic system are relatively complex, as, for example, in the case of automatic posting of payments from statement stubs returned with remittances, manual arrangement of the stubs in uniform orientation prior to insertion in the automatic handling device may, and normally will, impair the economic value of the over-all system only to a minor extent. Where, however, the operations subsequent to the uniform arrangement are relatively trivial, as in a case where the sole operation which is to be performed after uniform arrangement is the sorting of the information-coded objects into appropriate bins or other receptacles, a system which requires manual arrangement of the objects to be sorted in uniform orientation prior to insertion into the automatic sorting equipment may well be economically worthless; the additional work required of a person performing the arranging operation in, for example, reading the information in the last line of an address on an envelope and depositing the envelope in an appropriate bin is negligible, the manual work involved in arranging the envelopes for insertion into an automatic machine being essentially as great as that involved in performing the entire operation by hand. There is thus created a great economic need for a suitable device for automatically arranging the envelopes in uniform orientation.

It is, of course, a relatively simple matter with modern mechanical techniques to place the envelopes in uniform orientation as they are fed from a bin or hopper into which a bag of mail has been dumped, provided that the relative orientation of each envelope can be sensed as it passes a sensing station. It is further fairly obvious that the best way of determining the orientation of an envelope is by sensing the location of the postage stamp (including metered postage machine stamp, mailing permit designation, etc.), which is essentially universally in the upper right hand corner of the face of an envelope. The problem of sensing the presence of the stamp is, however, a highly difficult one.

Tactile means for sensing the location of a stamp are impractical because stamps are not of uniform size and are frequently attached in sets, and mere edge detection is inadequate to discriminate between the edge of a postage stamp and the edge of any other type of affixation, or even the lapped edges employed in forming and closing of envelopes. Light reflection has been attempted, but it is found that this method of detection is caused to produce excessive false results by inability to distinguish between postage stamps, Christmas seals, air mail stickers, imprinted colored trade-marks, and similar false indicators. The difficulties with this type of detection are multiplied by the variety of colors used in stamps, particularly when considering the use of colored envelopes.

Another approach to detection of the stamp is the use of electrical or magnetic properties. For example. the stamp may be detected by a magnetic property imparted to it in its manufacture. Such a method of detection, however, is generally unable to discriminate between a stamp on the outer surface of the envelope and a stamp or other material having the required properties within the envelope. A further proposal involves the sensing of conductivity. This proposal is subject to the very serious objection of requiring that the stamp be constructed of metal foil or similar conducting material, and the further objection that the constancy of contact required for direct conductivity sensing would be destroyed by the presence of glue, dirt, or other insulating material at the point of contact on the stamp, and obviously scratching action at the point of sensing to assure good contact cannot be tolerated because of injury to the mailing piece.

One type of sensing which has been in recent years multiplying in utilities of various sorts is the employment of radioactivity and of artificially generated beams of electromagnetic radiation similar to radioactivity, such as X-rays. The presence, for example, of minute amounts of activity in a stamp may readily serve as an indicator in an automatic system such as being described. Such a solution, however, is rendered impractical by the fact that large numbers of stamps ordinarily appear together at post offices, mailing rooms, etc., either in affixed or unaffixed form, and such aggregation of even the small quantities required for detection of an individual stamp produces a prohibitive radiation hazard.

Another possibility of employing radioactivity would be by way of absorption properties, i.e., with a source on one side of the envelope and a detector on the other; such a solution, however, is completely unacceptable because such a system is not only unable to distinguish between the two sides of the envelope, but is additionally unable to distinguish between the exterior of the envelope and its contents.

The present invention provides a method and apparatus employing radioactivity or similar electromagnetic radiation which solves the problems outlined above in a unique fashion. It is found in accordance with the present invention that a suitable indication of the presence of a postage stamp may be obtained by scanning each side of the envelope with beta-rays of a particular energy range and detecting the scattered beta-rays returned by the various portions of the surface of the envelope, including the stamp, the contrast between the scattered beta-rays reflected from the exposed envelope portion and those returned by the stamp being a reliable indicator of the presence of the stamp at a particular place on the envelope, and thus providing an electrical signal which may readily be employed to actuate suitable mechanical apparatus to manipulate the respective envelopes in such a manner as to produce uniform orientation in subsequent parts of the automatic handling.

In its broader aspects, the stamp detection method of the invention, wherein the stamp is detected by scanning the surface of the envelope with beta-rays and simultaneously detecting beta-rays back-scattered by the portions of the surface scanned, may be extended to detecting any type of surface material discontinuity. However, as will hereinafter be seen, the invention will be of greatest utility in connection with the reading in and reading out of coded information (the detection of the presence of a stamp being merely a simple instance of reading out of coded information which has been read in by affixing of the appropriately constructed stamp). The invention will herein be described in detail only as regards the particular information read-in and read-out system which has been discussed above, i.e., an automatic system for mail handling, but its applications in its broader aspects will be obvious from the discussion of the principles of operation and design, including selection of beta-ray energies, which will be set forth in connection with the described utilization of the invention.

Broadly speaking, the scientific information that various materials produce varying degrees of scattering and absorption of beta-rays is well known, and constitutes in itself no portion of the present invention. Furthermore, various uses have heretofore been made of this known scientific fact. The present invention, however, stems from the recognition of the manner in which the scattering phenomenon may be employed to solve numerous problems in information encoding and read-out, particularly in problems like that presented by the postage stamp detection device, wherein the information to be detected appears on the surface of a container whose contents cannot be permitted to affect the measurement or to be affected by the measurement, and where the presence of dirt and other foreign materials on the surface bearing the information to be read out must be tolerated.

The essence of the invention stems from utilization of the fact that the materials most commonly employed to bear coded information (not only papers but also plastics and similar materials) consist practically entirely of materials of low atomic number and thus are low in back-scattering. Both the absorption and scattering of electrons (beta-rays) may in general be said to be functions of atomic number. Both phenomena, of course, occur in any material. However, with materials of low atomic number such as hydrogen and carbon which constitute by far the greatest proportion of the atoms of which organic materials such as papers and plastics are composed, the scattering is relatively small, the greatest effect being absorption. On the other hand, with materials of high atomic number, such as, to take an extreme example, metallic lead, there may be emitted from a surface under bombardment by beta-rays a number of beta-rays equalling, or even exceeding (the process known as electron multiplication), the incident beta-rays, such back-scattered radiation resulting from both deflection of the charged particles and absorption accompanied by emission. Thus the scanning of a piece of paper having thereon an affixation such as a postage stamp having at, or sufficiently near, the surface, a material of high atomic number, will produce adjacent to the surface of the stamp a much greater amount of scattered radiation than is produced adjacent to the rest of the surface. A similar result is achieved where the paper has a portion which is treated by impregnation, etc., to have a relatively high average effective atomic number. With an envelope bearing a suitably prepared postage stamp, or any paper having information placed thereon in the form of a surface attachment or body treatment of average effective atomic number of sufficient magnitude, an electron source and a beta-ray detector adjacent to a path defined by some means for transporting the paper will serve to read the information from the paper if the detector is shielded from the source and the source and the detector are located to irradiate the member and detect electrons emitted by the member, respectively.

In its most advantageous applications the present method and apparatus are employed in connection with information on a surface behind which lie unknown or varying objects or materials which must not affect the information-reading process. For these purposes, in order to be of maximum utility, it is found that particular beta-ray energies must be employed for satisfactory results. In order to understand the importance of the energy, and the great advantages achieved by employment of beta-rays of particular energies, it is necessary to understand the practical considerations encountered in designing an automated system employing the general method herein taught. The application of the method to the detection of information (in the form of a postage stamp or other information later to be discussed) from envelopes will now be considered in this connection.

It may be assumed from a practical standpoint that a system of the type under discussion must operate in air at atmospheric pressure, rather than in a vacuum or other medium of notably low beta-ray absorption. Likewise, a reasonable distance must be preserved in this medium between the source and detector, on the one hand, and the rapidly moving envelope on the other. The distance from the source to the portion of the envelope scanned by the source inevitably produces degradation of the energy spectrum of the source and absorption of electrons prior to impingement on the surface being scanned. A further energy degradation takes place in the scattering process; as is well known, the scattered electrons are of lower energy than the incident electrons, and further energy degradation and absorption takes place in the air encountered in the return path to the detector; additionally the detector has a minimum residual energy of the betas it will detect, in general fixed by its window thickness.

Beta-ray energies as emitted by a radioactivity source are not mono-energetic, but constitute a large range, the maximum energy being commonly designated $E_{max.}$, and being the energy which is associated with a particular emitter for purposes of identification, although in fact the actual emissions from a practical source are of much lower average energy. It will accordingly be understood that the designation herein of a beta-ray source as being productive of beta-rays of any given energy, expressed in electron volts, refers to the maximum energy rays produced by the source.

The higher the energy of the beta particles employed, the greater will be the absolute signal at the detector at any point in a given scan, for the reasons set forth above. The lower limit of beta-ray energy, which can be used successfully, (in the absence of "spurious" surface materials) is the minimum energy required in order to obtain substantial counting rates at the detector of sufficient magnitude to permit accurate measurement in the time allotted for the scan, which is necessarily performed in a time of the order of a fraction of a second. This minimum energy is a function of energy absorption by the air and the window of the counter (where a window is employed), and accordingly of the spacing and the particular detector employed. Where the source and the detector can be placed as close as 1 millimeter from the envelope, electrons of energy of as low as 10 kev. may be employed with a windowless counter. Where the face of the envelope is, by the mechanical system employed, reliably maintained at the proper spacing, such energies may, by suitable pains as to system design, be made practicable. However, where it is impractical (as it generally will be) to assure that such small spacings will not produce damage to the system or improper operation if, for example, an envelope is overly thick or contains a bulky object, higher spacings must be employed, ¼ inch being a typical example of the clearance which must be maintained. At such distances, the beta-rays should be at least equal in energy to those of carbon 14 and are preferably substantially higher in energy, as will appear more fully hereinafter.

The maximum beta-ray energy which should be employed in the method as applied for present purposes is a function of the material and thickness of the envelopes, and cannot greatly exceed an energy which is sufficient to permit a large percentage of betas to penetrate the forward and return air gap and the detector window thickness, as described above, plus twice the thickness of the envelope. This limitation on the upper energy limit stems from the necessity of distinguishing between the scattering material on the exterior of the envelope (i.e., the stamp), and scattering materials (stamps, coins, etc.) within the envelope which will otherwise produce false indications. With envelopes of all types commonly employed, it is found that complete discrimination against the envelope contents may be obtained with energies up to about 500 kev., the 230 kev. beta radiation of promethium 147 producing, for example, no substantial response to envelope contents. For convenience and safety reasons, it may sometimes be desirable to use an emitter of somewhat higher energy, such as krypton 85, and to degrade the energy spectrum by a suitable auxiliary back-scattering structure on the source assembly, thus effectively producing a source of energy less than 500 kev., by degrading the entire spectrum (if direct source radiation is shielded) or by enhancing the relative magnitude of the lower energy portions of the spectrum (if the auxiliary back-scattered radiation is added to the direct radiation). The 230 kev. betas of promethium 147, however, are well adapted for the purpose without degradation. Measurements indicate that practically all envelopes are of a minimum thickness of about 4 milligrams per square centimeter, and the maximum energy of the beta-rays employed is fixed by this minimum thickness of the envelopes. Of course, where the general method is used with background materials of lesser or greater thickness, the energy selection will be appropriately modified in accordance with these principles.

The requirements of the scattering coating will vary somewhat with the energy of the beta particles employed and the spacing factor mentioned above, and also with the permissible error (i.e., required "contrast" between stamped and unstamped portions of an envelope). There has been, prior to the present invention, little exploration of the phenomenon of back-scattering which would lead to practical solution of the problem solved by the present invention. However, the present invention, based upon the recognition of the applicability of back-scattering to the solution of problems encountered in automatic information communication, particularly the specific problem herein discussed, leads to the application and extension of the theory now known to produce systems of maximum efficiency and accuracy.

In simpler applications of the teachings of the invention, little if any extension of known theory and experimental knowledge is required in order to devise fully satisfactory systems. The scattering coefficients of various materials, particularly pure metals, have been made the subject of measurements which appear in the literature. In general, such measurements have been made, and coefficients are therefore available, for thicknesses of materials which are "infinite" in the sense that additional thickness will produce no change in measured back-scattering. Where the general method of the invention is to be applied to information regarding surface discontinuities such as the interface between two surface portions which are both infinite in thickness, and no other limitations are placed upon the manner of detection of the information inherent in such interface, the selection of appropriate materials may be readily made from such published information.

In the case of the envelope detection problem herein specifically dealt with, however, such is not the case. As previously indicated, in this problem the background material, paper, is in general composed of substances of such low average effective atomic number as to be highly desirable as contrast material for beta scattering information indications. However, the thickness of this material is found to be of a range such that the lower limit of thickness is necessarily far from infinite, yet the system must discriminate against particles which are back-scattered by a material at the reverse side of the information-bearing layer consisting of the face of the envelope. A further limitation is imposed by the necessity of discriminating against "spurious" surface attachments such as printing on the envelope (many pigments being of high average atomic number), and stamps or seals other than the postage stamp which is of interest. These requirements make the construction of the stamp (or other information-indicating material) fairly critical. One possibility, of course, is a construction wherein the stamp body is made of a pure material of high atomic number such as lead in the form of a foil of sufficient thickness to be virtually infinite as regards back-scattering. As a practical matter, however, although such a solution offers great advantage over the use of metallic foil stamps for conductivity or magnetic property detection, as indicated above, the suitability of this type of information indication is of doubtful economic practicality in the case of postage stamp use, thus rendering such a design substantially inferior in a practical sense to others which may, with proper care, be reached without producing readily apparent differences between the stamps constructed in accordance with the teachings of the invention, and conventional postage stamps heretofore employed.

Back-scattering coefficients of atomically pure materials vary monotonically with atomic number. The increase in back-scattering coefficient is substantially less than linear with increase in atomic number, the coefficient being substantially proportional to the two-thirds power of the atomic number. Back-scattering is practically negligibly small in hydrogen, and only somewhat greater in carbon. Most of the back-scattering encountered in paper is due to heavier material present in small quantities. Further, the energy degradation which occurs in the materials of lower atomic number is much greater than in materials of higher atomic number; since practical embodiments of the invention require substantial residual energy of back-scattered radiation in order that it can be detected, this further increases the "contrast" which can be observed. The variation of back-scattering coefficient with atomic number, when coupled with the knowledge that absorption of beta-rays of any given energy is a function, to a first approximation, primarily of mass per unit area, permits fairly accurate determination of the back-scattering behavior of reasonably homogeneous mixtures and of compounds which represent the more practical manners of introducing materials of suitable atomic number into postage stamps (or other information-bearing attachments).

The effective atomic number of a compound (other than compounds containing hydrogen) may be calculated by summing the atomic numbers of the elementary constituents of the compound, each being weighted by the weight percentage present, which gives a result similar to the root mean square value of the atomic numbers. Thus, for example, barium sulphate has an effective atomic number of about 37 and lead chromate about 57. The average effective atomic numbers of mixtures are similarly computed, except that actual effectiveness is substantially reduced where hydrogen is present in appreciable quantities. Back-scattering measurements indicate that the maximum average effective atomic number of practically all papers encountered in envelopes is about 4 or 5.

Although for laboratory purposes, the scattering effect may be used to distinguish between surfaces of relatively small differences in average effective atomic number and of relatively small thickness, in an industrial or commercial type of information read-in and read-out system, particularly of the type of the mail-sorting herein specifically discussed, a relatively high degree of contrast is required. Furthermore, the response obtained from the postage stamp, in the present instance, must be much greater than that obtained from extraneous materials present in the envelope. The practical minimum average effective atomic number required for this purpose (i.e., to produce a degree of contrast suitable for high-speed discrimination between papers ordinarily encountered and a suitably treated stamp or other information attachment) is approximately 15 (contrast factor of about 2) with an average effective atomic number of approximately 25 (contrast factor of about 3) being required to produce fully reliable discrimination against the thin pigment layers used in inks employed on "spurious" information such as stickers and imprints, etc., on envelopes. Scatterers of effective atomic number of 40 or more (contrast factor of 4 or more) are readily available and should be used to simplify the instrumentation. It will, of course, be understood that these minima are determined empirically, since the compositions of the papers used in envelopes vary substantially, as do practices in the attachment of seals, etc., to envelopes. It will thus be apparent that the minimum effective average atomic numbers stated correspond merely to reasonably accurate discrimination (for example 3 to 5 percent error) in high-speed operation, and that the use of materials of higher average atomic number is desirable to discriminate against unusual practices, such as the use of metallic pigments or coatings on envelopes or stickers, the employment of pigments of metals such as aluminum in inks being sufficiently frequent to create a problem where extremely high error standards are imposed.

The contrast ratios described above are obtained with conventional types of source-and detector geometries, designed for the production of maximum counting rates in the detector, i.e., detection of the maximum amount of back-scattered radiation. Where intense sources can be used, or where maximizing of counting efficiency is not required, even higher contrast ratios can be obtained by more efficient use of the difference in energy degradation and angular dispersion distribution in the back-scattered radiation. In the light materials, particularly hydrogen, the distribution pattern of the back-scattered betas is in general much more random than in heavy materials. The use of a collimated beam source normal to the scanned surface and a small-area detector responsive only to small-angle scattering produces greater apparent contrast. Conversely, advantage may be taken of the fact that large-angle scattering in light materials is typically accompanied by very great energy degradation, so that the employment of a detector of high threshold energy, although reducing the "efficiency" in the sense of counting rate, may nevertheless increase the contrast by proper design.

The required thickness of the beta-scattering layer is, because of the problem here involved, widely variable with the material of which it is composed, and also with the energy of the electrons employed in the measurement and the amount of parasitic absorption of energy and beta particles which results from the air gaps and the detector window. There appear in the literature measurements made for scientific investigating purposes of the effective depth of various materials with regard to beta-ray scattering. At least one investigator has reported that the effective depth is approximately 20 percent of the thickness required for absorption of all beta-rays. It would appear superficially that optimum thickness for the present purposes would not be reached with substantially lesser thicknesses. Upon examination and experiment, however, it is found that such a conclusion is unsound, the thickness required for maximum efficiency of the present method being substantially less than would be thus predicted, thus permitting fully efficient employment of the present method within thin layers which are easily applied and produce no obvious large difference between stamps made in accordance with the present method and conventional stamps.

The ability of the present method to obtain optimum contrasts with thickness far smaller than might have been predicted on the basis of the findings as to effective thickness for back-scattering heretofore made can be understood by further analysis of the mode of operation coupled with further observations regarding the scattering process. Although the full theory of electron scattering is but poorly known, it appears reasonable to assume that the energy degradation of the back-scattered electrons varies in accordance with the depth of the penetration of each electron emitted at the bombarded surface (or its predecessor, in the case of electrons returned by capture and new emission processes). In the present process or method, an electron which is emitted from the bombarded surface with insufficient energy to traverse the return air gap and the window of the detector is effectively lost to the process. As previously indicated, the parasitic energy loss consisting of the energy dissipated in traversing the two gaps and the detector window represents a minimum source beta energy which is possibly capable of participating in the detection. Since the scattering process inevitably involves energy degradation, operation of the system obviously requires that the source beta energy have at least some electrons of an energy higher than this minimum, the differential of energy thus required being designated the "excess energy."

When all of these factors are considered, it will be seen that maximum efficiency of the system is reached when the thickness of the detecting layer is such that further thickness addition would produce at the surface back-scattered betas of only an energy insufficient to traverse the gap to the detector (including the window of the detector). Stated in other words, the effective thickness for purposes of the present measurement is the thickness which is effective in back-scattering the incident betas without the loss or degradation of energy by an amount greater than the excess energy, as defined above. An approximation of such thickness may be obtained from well-known principles of energy dissipation of betas, and shows that very thin films, of the order of as little as 0.5 milligram per square centimeter, which are easily produced or applied with properly chosen materials, are fully adequate to constitute virtually infinite thickness for purposes of the present measurement or method.

The principles just discussed concerning film thickness lead to further refinement in the method by selection of proper beta energy. It will be seen from what has just been said, upon study, that the use of very low excess energies will make it difficult to discriminate between the layers bearing the information and the very thin "spurious" layers of similar materials which may be present for extraneous reasons. On the other hand, since it is known that the energy spectrum of back-scattered betas is much more degraded in materials of low average atomic number, such as hydrogen and carbon, than in higher average atomic number materials, the use of small values of excess energy will magnify the contrast between the paper and the detecting layer (but also by the same token, the contrast between the paper and spurious detecting layers). It has previously been indicated that the upper limit of energy which can be employed in the case of envelopes of unknown contents is fixed by approximating the point at which the excess energy is consumed by the degradation of energy suffered by a beta traversing the face of the envelope, scattering from a metal object within it, and returning to the outer face of the envelope, with the thickness and envelope material atomic number being approximately the minimum that can be expected to be encountered.

When all of these factors are considered, it is seen that the most desirable beta energy for use with envelopes known to be "clean" (as may be true in certain applications of this aspect of the invention other than mail-handling) is slightly above the minimum prescribed by the necessity of the existence of excess energy, and the most desirable energy for discriminating against thin spurious back-scattering layers which may exist in applications such as the mail-handling system of the invention, is in the region of the maximum permissible, in which case, of course, the detection layer is made close to "infinite" in thickness, i.e., of a thickness such that additional thickness would not produce additional back-scattering of electrons with sufficient energy to be detected. From extension of these principles, it may be seen that this beta energy, and the corresponding "infinite" thickness of the absorber layer, when correlated with the other maximum energy consideration (minimum thickness and average atomic number of the envelope or other background material likely to be encountered) indicate that the best discrimination against spurious back-scattering layers, either on or behind the background material, is achieved when the thickness of the detection layer (in mass per unit area) is at least of the same order of magnitude as the minimum expected background thickness. Actually, however, apparently because of the fact that materials of high atomic number produce greater absorption per unit mass thickness than those of lower numbers, it is found that excellent results are achieved with scatterer thicknesses of as little as half of background material thickness.

The application of these principles to the mail-handling problem leads to the design of a highly efficient system. Based on the considerations of envelope thickness mentioned above, and with the source and detector operating at slightly more than ¼ inch from the scanned surface, the optimum energy is found to be in the neighborhood of 200 to 400 kev., promethium 147 (230 kev.) being one desirable source from the standpoint of availability and half-life. One desirable construction for the detecting layer is, for example, lead sulphate or lead oxide of a thickness of 1 to 2 milligrams per square centimeter. This layer may form the base of printed material on a stamp (the printing being negligible in thickness) or may be coated over the printing, being practically transparent at such thicknesses. If more transparency is desired in such upper layer, there may be used, for example, barium sulphate, which is not only substantially transparent in such a thickness but avoids problems of toxicity which may arise in the case of lead compounds. Needless to state, the examples mentioned are merely exemplary of a tremendous number of compositions which may be used in such layers, or may be impregnated directly in the paper base of the stamp. It will be noted that the scattering material may be covered with a thin layer of low atomic number material if proper adjustment of the increased excess energy thus required is made.

A layer such as described produces large contrast factors in the counting rate when tested with a large variety of envelope materials commonly employed, using promethium 147 as a source at a distance of ¼ inch and with a detector having a window thickness of 1.4 milligrams per square centimeter at a distance of ⅜ of an inch. Further, the contrast between the detection layer and spurious detection layers (i.e., coloring and printing on envelopes, seals, etc.) can be made to be at least 1.5 even with the worst samples of spurious layers found in a typical collection of envelopes and envelope materials obtained for the purpose.

Persons skilled in the art will readily devise many applications of the method above generally set forth, and types of apparatus for its implementation. However, in accordance with the requirements of the patent laws there are illustrated in the attached drawing, and described below, certain embodiments of these general teachings.

In the drawing:

FIGURE 7 is a view partially in section illustrating a modified form of device for transporting and detecting the orientation of envelopes, with an envelope illustrated therein;

FIGURE 8 is a partially sectional view of a source and detector, fragmentarily illustrated, constituting a portion of the device of FIGURE 7;

FIGURE 9 is an end view of the device of FIGURE 8;

FIGURE 10 is a fragmentary diagrammatic view of another type of source and detector assembly which may be employed; and FIGURE 11 is a view in front elevation of an envelope upon which address information has been placed in the manner taught by the invention.

Figure 1:
FIGURE 1 is a view in front elevation of a postage stamp of the adhesive type particularly adapted for practice of the invention.

The stamp 20 illustrated in FIGURE 1 is of completely conventional appearance and is of the adhesive type, for illustrative purposes. Indeed, it is found possible to practice the present invention in a very limited sense to detect the presence and location of a stamp on an ordinary envelope, even where the stamp is of a construction in common use, provided that the printing on the surface of the stamp contains materials of sufficiently high average atomic number, such as barium and lead chromates and sulphates frequently used as pigments. However, the back-scattered electron density variation encountered in scanning due to the stamp pigments cannot be relied upon for this purpose, both because of the very thin and non-uniform coatings employed, and because of variations in pigments and their concentrations, many postage stamps producing scattering effects not substantially greater than that of unpigmented paper. Further, a system designed to respond to pigments of types commonly encountered on postage stamps as conventionally constructed would inevitably be unable to distinguish the desired objects of detection from other similar pigment coatings, such as seals and stamps of other types, return address indicia, and colored envelopes. Accordingly, the stamps designed for use in the method of the present invention are preferably of special construction, as shown in FIGURES 2, 3, and 4.

Figure 2:
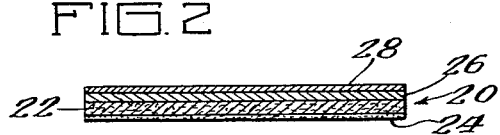
FIGURE 2 is a transverse sectional view taken along the line 2—2 of FIGURE 1.

As shown in the cross-sectional view of FIGURE 2, the stamp 20 has a conventional paper body 22 with an adhesive coating 24 on the back. Coated on the upper surface of the paper body 22 is a coating 26 of a material of high average atomic number, such as lead sulphate, a white pigment. The conventional printing 28 is imprinted on this coating. With such a construction, since the printing layer 28 is extremely thin, variations in the printing pigment are substantially immaterial to proper operation, since high atomic number inks will participate in the scattering, while low atomic number inks will not be of sufficient thickness to greatly absorb or degrade the betas incident upon and scattered by the coating 26.

Figure 3:
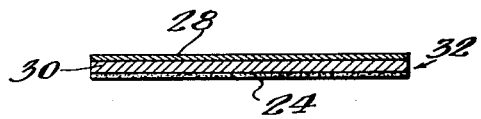
FIGURE 3 is a view corresponding to that of FIGURE 2, but illustrating a modified construction of a stamp.

In the modification of FIGURE 3, the body 30 of the stamp 32 is of lead foil, the adhesive 24 and printing layer 28 being the same as in the previously described stamp.

Figure 4:
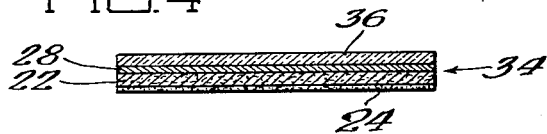
FIGURE 4 is a further sectional view corresponding to FIGURE 2, but illustrating a further modification.

A further alternate construction is shown in FIGURE 4. Here the stamp 34 has a paper body 22 and adhesive backing 24 as in FIGURE 2, but the printing 28 appears directly on the paper body, as in a conventional stamp. The front surface bears a substantially transparent coating 36 of high average atomic number.

Figure 5:
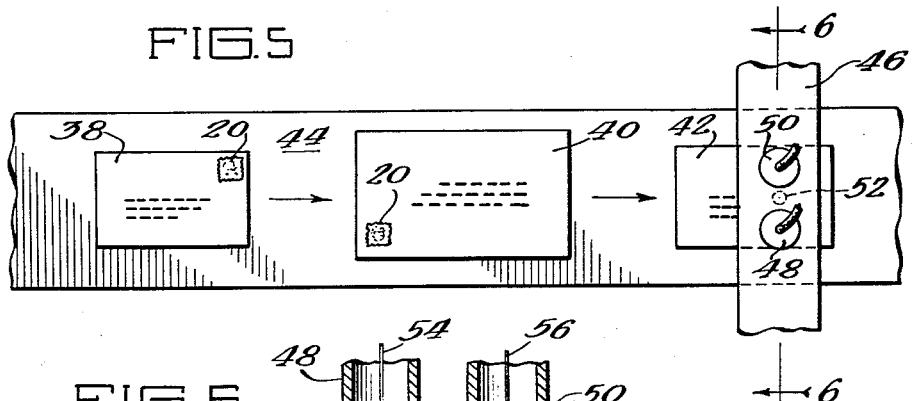
FIGURE 5 is a more or less schematic view of a conveyer bearing envelopes which have been previously placed with envelope faces up, but not yet sorted as to rotational position, together with a schematically indicated device for detecting such position.
Figure 6:
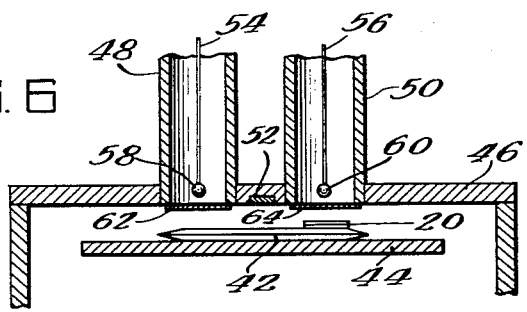
FIGURE 6 is a sectional view taken along the line 6—6 of FIGURE 5.

FIGURES 5 and 6 show one form of automatic equipment for read-out of the information borne by the scattering attachment (the postage stamp 20 in this case).

As shown in this elementary type of embodiment, the envelopes 38, 40 and 42, have previously been arranged face up on a conveyer belt 44 (preferably by apparatus utilizing the same general method). Envelopes 38, 40 and 42 have also been arranged so that they lie with their long dimensions extending longitudinally, rather than transversely, on the conveyer belt. The only position determination remaining in this simple form of utilization of the invention, selected beacuse of simplicity of illustration and description and understanding, is the determination as to which of the two alternate positions is occupied by each of the envelopes. The successive envelopes pass under a holding bracket 46 which maintain in position a pair of end-window Geiger counters 48 and 50, between which, in a position corresponding to the center of the belt, is a beta source 52. The Geiger counters 48 and 50 schematically illustrated are of the conventional end-window type, having center-wire electrodes 54 and 56 each terminating in a ball 58 and 60 to prevent excessive fields at the end of the wire and each having a window 62 and 64. As will readily be apparent from the previous discussion, the counters 48 and 50, which may be differentially connected in the associated electronic circuit and relay system (not shown), will readily determine the position of the stamp 20, and accordingly control a suitable mechanical manipulation system to place all envelopes in a uniform position for further processing.

In FIGURE 7 is schematically shown a further embodiment in which both sides of the envelope are scanned in a single operation, thus determining all aspects of the position of an envelope in one operation, and permitting the employment of a suitable manipulation of all envelopes without further successive sensings of stamp position. Here the envelope 66 travels on a conveyer 68 and is held in centered position in the sensing device by springs 70 or other suitable means.

Source-and-detector assemblies 72, 74, 76, and 78 are located in supports 80 and 82 to scan the edges of the envelope 66 as it passes on the conveyer (preferably being offset so that each source does not irradiate the opposite detector). Each of these source-and-detector assemblies is of the type fragmentarily illustrated in FIGURES 8 and 9. As shown in these figures, the counters are of the flow type, and are of a construction which is commercially available, being described in the copending application of Jeno M. Barnothy, Serial No. 529,856, and are accordingly described only briefly herein. For present purposes, it is adequate to point out that the gaseous ionizing medium of the counters flows through from inlets 84 to outlets 86, continuously flushing the center wire or electrode loop 88, this construction enabling the use of a very thin window 90. The window 90 is mounted on a mounting ring 92. For use in the present invention, the mounting ring 92 supports at the center of the window, by means of holder wires 94, a beta radiation source 96. A source-and-detector assembly such as illustrated, wherein the source is centered on the sensitive region of the counter, maximizes the efficiency in detection of beta-rays from the source scattered from portions of the envelope, the spacings and beta-ray source being as previously described herein.

In FIGURE 10 is illustrated a further type of scanning device. In the illustrated embodiments previously described, the scanning performed may properly be described as a "moving scan," the source-and-detector, on the one hand, and the envelope being scanned, on the other, being moved with respect to each other during the scanning operation to perform the scan. The source-and-detector scanning assembly 98 of FIGURE 10 is designed for stationary scanning, and consists of a matrix of sources 100 and detectors 102, the matrix being larger than any envelope which it is contemplated will be encountered. In this type of scanning, the surface to be scanned is merely brought up to the detector, and the indications of the detectors 102 are brought out to a suitable electronic system for control. It will be observed that to the extent that the time of exposure of any elemental area is a limitation upon the speed of operation of the device, a scanner such as shown in FIGURE 10 permits much faster operation, since all area elements are measured simultaneously.

In FIGURE 11 is shown an extension of the teachings of the invention to the coding of address information on an envelope. Here dots or markings 104 have been placed in a standard position (lower right hand corner) on an envelope, the location of the dots or markings, and their absence from certain locations, constituting the address information in a conventional type of code. The dots or markings 104 are in the form of back-scattering codings such as described above, and the address information may be read out by moving or stationary scanning.

The adaptation of the invention to a wide variety of embodiments will readily suggest itself to persons skilled in the art. Although an important aspect of the invention is in the impressment of coded information and reading out of such information in a system for the automatic handling of mail, the extension or application to other types of information impressment and read-out systems will be apparent, as will other applications of the teachings of the invention regarding the employment of scattered radiation, the advantages thereof, and the manner in which such advantages may be realized. Further, although the invention has been described in detail with reference to beta particle and electron sources and detectors, and systems incorporating such sources and detectors, it will be seen that certain aspects of the teachings will be adapted by persons skilled in the art to systems employing scattering of other types of radiation, such as X-rays of a hardness or energy selected in accordance with the teachings of the invention. Accordingly, the scope of the invention shall be deemed to be limited only by the wording and spirit of the attached claims, rather than by the particular embodiments herein illustrated and described.

What is claimed is:

1. A method of producing an electrical signal indicative of the presence of a coating of a material of relatively higher average effective atomic number on a portion of the surface of a thin background layer of a material of lower effective average atomic number comprising scanning the surface with radiation and simultaneously detecting, at a location separated from said surface by a gap of atmospheric air, radiation back-scattered by the portions of the surface scanned, the radiation being of lesser energy than the energy required for substantial detection of radiation traversing and retraversing the layer but being of an energy sufficiently great to traverse the layer and to render a substantial portion of the thickness of the coating effective in back-scattering, and producing an electrical signal in accordance with such detection, whereby the indicated location of the coating is substantially independent of materials behind the layer and of spurious indications produced by coatings of lesser-back-scattering effectiveness of materials on the surface.

2. A method of indicating the location of a postage-paid indicator on a paper envelope, the indicator being of higher average effective atomic number than the envelope, comprising scanning the surface of the envelope with beta-rays of an energy sufficient to produce substantial penetration through the envelope but insufficient to produce substantial return of beta-rays through the envelope, and simultaneously detecting, at a location separated from said surface by a gap of atmospheric air, beta-rays back-scattered by the portions of the surface scanned.

3. A method of placing coded information on individual paper members of a set and thereafter reading out the information comprising placing at a predetermined location on such individual members indicia of material of average effective atomic number of at least 15 and of a thickness of at least 0.5 milligram per square centimeter and thereafter exposing said location on each member to beta-rays while detecting the back-scattered radiation therefrom.

4. A method of recording and reading out information onto and from a paper comprising impressing such information in the form of at least one coating portion of average effective atomic number at least equal to 15 and thereafter exposing such paper to electrons of an energy sufficiently high to produce substantial penetration through both the paper and the coating portion but insufficiently high to produce substantial return of electrons through the paper from any substance behind the paper while producing an indication of electrons emitted by the portions thereof.

5. A method of recording and reading out information onto and from the surface of a paper container comprising impressing such information in the form of at least one portion of average effective atomic number of at least 15 and exposing such portion to a fixed value of beta-ray irradiation of an energy sufficient to produce substantial penetration through the container but insufficient to produce substantial return of beta-rays penetrating through the container while producing an indication of electrons emitted by such portion and traversing a gap of atmospheric air to read the information.

6. The method of claim 5 wherein the beta-rays are of an energy such that the thickness of said portion is substantially the effective thickness for the detection of beta-rays back-scattered by such portion.

7. A method of indicating payment of postage on a paper mailing piece comprising affixing thereto a postage-paid indicator having at least a layer thereof of an average effective atomic number of at least 15 and of a thickness of at least 0.5 milligram per square centimeter.

8. A method of detecting coatings of materials of average atomic number of at least 15 on thin bases of materials consisting predominantly of components of atomic number at most equal to that of carbon, said bases having varying substances therebehind, comprising scanning the front surfaces of the bases with beta-rays and simultaneously detecting beta-rays scattered by the portions scanned, the energy of the beta-rays being less than the energy required for the substantial detection of beta-rays traversing the bases and back-scattered from substances behind the bases but greater than the energy required for traversing the bases.

9. A method of detecting coatings of a known minimum thickness of materials of average atomic number of at least 15 on portions of bases of materials consisting predominantly of components of atomic number at most equal to that of carbon, in the presence of other coatings on other portions, comprising scanning the front surfaces of the bases with beta-rays and simultaneously detecting, at a location separated from said surfaces by a gap of atmospheric air, beta-rays scattered by the portions scanned, the energy of the beta-rays being substantially higher than the minimum required for detection of beta-rays scattered by the coating and substantial penetration through the bases but insufficient to produce substantial return of beta-rays from the opposite side of the bases, to discriminate against spurious coatings of lesser back-scattering effectiveness than the coating to be detected and against materials on the opposite side of the bases.

10. A method of detecting coatings of a known minimum thickness of materials of average atomic number of at least 15 on thin bases of materials consisting predominantly of components of atomic number at most equal to that of carbon, said bases having varying substances therebehind, comprising scanning the front surfaces of the bases with beta-rays and simultaneously detecting beta-rays scattered by the portions scanned, the energy of the beta-rays being less than the energy required for the detection of beta-rays traversing the base and backscattered from substances behind the base but substantially greater than the minimum energy required for the detection of beta-rays scattered by the coating and sufficient to traverse the bases so that discrimination is maximized against spurious coatings of lesser back-scattering effectiveness than the coating to be detected and against variation in the substances behind the thin bases.

11. The method of claim 10 wherein the thicknesses of the bases differ, and the energy of the beta-rays is slightly less than that at which substantially all beta-ray radiation is absorbed by a base of twice the minimum thickness.

12. The method of claim 11 wherein the bases are paper envelopes and the coatings are postage-paid indicators.

13. A method of detecting coatings of fixed thickness of materials of average atomic number of at least 15 on portions of thin bases of materials consisting predominantly of components of atomic number at most equal to that of carbon, in the presence of other coatings on other portions, comprising scanning the front surfaces of the bases with beta-rays and simultaneously detecting, at a location spaced from said surfaces by a gap of atmospheric air, beta-rays scattered by the portions scanned, the energy of the beta-rays being substantially greater than that at which the effective thickness of the coating material for backscattering is essentially equal to the thickness of the coating and sufficient to produce substantial penetration through the bases but insufficient to produce substantial return of beta-rays through the bases, to maximize the contrast between the coating being detected and coatings of lesser back-scattering effectiveness while discriminating against materials behind the bases.

14. A method of handling mail including the steps of affixing to the surface thereof indicia in the form of coatings of substantially fixed thickness of average effective atomic number of at least 15 and of a thickness of at least 0.5 milligram per square centimeter, thereafter scanning the surface with beta-rays and simultaneously detecting, at a location spaced from said surface by a gap of atmospheric air, beta-rays scattered by the portions scanned, and thereupon sorting the mail in accordance with indications of such detection, the beta-rays being of an energy below the energy at which back-scattered beta-rays from the contents are detected.

15. A method of recording and reading out information on sheets of paper and similar material comprising impressing such information in the form of at least one coating of average effective atomic number at least equal to 15 and of a thickness of at least 0.5 milligram per square centimeter and thereafter scanning the sheets with beta-rays and simultaneously detecting beta-rays scattered by the portions scanned, the beta-ray energy being sufficient to substantially traverse each sheet but less than that required for detection of backscattered radiation from the rear of the sheet.

16. The method of claim 15 wherein the thickness of the coating is approximately the full effective thickness of the coating for backscattering of the beta-rays.

17. The method of claim 15 wherein the beta-rays are detected at a location spaced from the sheets by an atmospheric air gap.

References Cited in the file of this patent
UNITED STATES PATENTS

| | | |
|---|---|---|
| 2,763,790 | Ohmart | Sept. 18, 1956 |
| 2,773,196 | Hall | Dec. 4, 1956 |
| 2,793,345 | Hags | May 21, 1957 |
| 2,855,518 | Foley et al. | Oct. 7, 1958 |
| 2,858,450 | Holben | Oct. 28, 1958 |
| 2,939,012 | Scherbatskoy | May 31, 1960 |

OTHER REFERENCES

Thickness Measurement of Thin Layers by the Backscattering of Beta Rays, by Danguy et al., from Proc. of the Second United Nations International Conference on the Peaceful Uses of Atomic Energy, vol. 19, pp. 176–179, United Nations Publication, 1958.